United States Patent
Nimri et al.

(10) Patent No.: US 7,623,156 B2
(45) Date of Patent: Nov. 24, 2009

(54) NATURAL PAN TILT ZOOM CAMERA MOTION TO PRESET CAMERA POSITIONS

(75) Inventors: Alain Nimri, Austin, TX (US); Junqing Shao, Round Rock, TX (US)

(73) Assignee: Polycom, Inc., Pleasanton, CA (US)

( * ) Notice: Subject to any disclaimer, the term of this patent is extended or adjusted under 35 U.S.C. 154(b) by 977 days.

(21) Appl. No.: 10/892,813

(22) Filed: Jul. 16, 2004

(65) Prior Publication Data

US 2006/0012671 A1    Jan. 19, 2006

(51) Int. Cl.
*H04N 5/232*    (2006.01)
*H04N 7/14*     (2006.01)

(52) U.S. Cl. ............................... 348/211.12; 348/14.08; 348/14.09

(58) Field of Classification Search .............. 348/14.08, 348/14.09, 14.1, 208.3, 207.11, 208.12, 211.7
See application file for complete search history.

(56) References Cited

U.S. PATENT DOCUMENTS

| | | | |
|---|---|---|---|
| 4,264,928 A | | 4/1981 | Schober ...................... 358/125 |
| 5,206,721 A | | 4/1993 | Ashida et al. ................. 358/85 |
| 5,272,526 A | * | 12/1993 | Yoneta et al. .............. 348/14.1 |
| 5,430,809 A | | 7/1995 | Tomitaka .................... 382/173 |
| 5,515,099 A | * | 5/1996 | Cortjens et al. ............ 348/14.1 |
| 5,526,041 A | * | 6/1996 | Glatt .......................... 348/143 |
| 5,568,183 A | * | 10/1996 | Cortjens et al. ............ 348/14.1 |
| 5,598,209 A | * | 1/1997 | Cortjens et al. ........ 348/211.12 |
| 5,686,957 A | | 11/1997 | Baker .......................... 348/36 |
| 5,742,329 A | * | 4/1998 | Masunaga et al. ........ 348/14.07 |
| 5,778,082 A | | 7/1998 | Chu et al. ..................... 381/92 |
| 5,923,364 A | * | 7/1999 | Rhodes et al. .............. 348/159 |
| 6,072,522 A | * | 6/2000 | Ippolito et al. ............. 348/14.1 |
| 6,166,763 A | * | 12/2000 | Rhodes et al. .............. 348/143 |
| 6,356,303 B1 | * | 3/2002 | Shibata et al. ........... 348/211.1 |
| 6,522,838 B1 | * | 2/2003 | Natsume et al. ............... 396/76 |
| 6,545,699 B2 | * | 4/2003 | Satoda .................... 348/14.05 |
| 6,593,956 B1 | | 7/2003 | Potts et al. ............... 348/14.09 |
| 6,618,073 B1 | * | 9/2003 | Lambert et al. .......... 348/14.08 |
| 6,628,887 B1 | * | 9/2003 | Rhodes et al. ................ 386/46 |
| 6,665,006 B1 | * | 12/2003 | Taguchi .................... 348/211.1 |
| 6,680,746 B2 | * | 1/2004 | Kawai et al. .............. 348/211.9 |
| 6,707,489 B1 | | 3/2004 | Maeng et al. .......... 348/211.12 |
| 6,731,334 B1 | | 5/2004 | Maeng et al. .......... 348/211.12 |
| 6,894,714 B2 | * | 5/2005 | Gutta et al. .............. 348/14.07 |
| 6,912,296 B2 | * | 6/2005 | Sim ........................... 382/107 |

(Continued)

*Primary Examiner*—Tuan Ho
*Assistant Examiner*—Selam Gebriel
(74) *Attorney, Agent, or Firm*—Wong, Cabello, Lutsch, Rutherford & Brucculeri, L.L.P.

(57) ABSTRACT

The system disclosed herein seeks to solve the problem of unnatural, dizzy camera motion when moving a camera between two preset positions, e.g., head and shoulder shots of two videoconference participants. Particularly, the system described herein attempts to mimic the camera movement that a professional camera operator would use in a professional video production. A preferred method of moving the camera between two positions is to first zoom out, away from the first position, pan across to the next position, then zoom in. This gives viewers of the camera content an idea of the spatial relationship between the two camera positions and also avoids the aesthetically undesirable effect of panning through irrelevant visual background at high zoom ratios. Disclosed herein is a technique of producing this desired behavior in the context of an automatically or semi-automatically controlled video camera, such as those used in conjunction with videoconferencing equipment.

21 Claims, 1 Drawing Sheet

U.S. PATENT DOCUMENTS

| | | | |
|---|---|---|---|
| 6,980,485 B2 * | 12/2005 | McCaskill | 367/119 |
| 7,057,636 B1 * | 6/2006 | Cohen-Solal et al. | 348/14.08 |
| 7,057,643 B2 * | 6/2006 | Iida et al. | 348/208.14 |
| 7,249,317 B1 * | 7/2007 | Nakagawa et al. | 715/209 |
| 2001/0055059 A1 * | 12/2001 | Satoda | 348/14.05 |
| 2002/0180878 A1 * | 12/2002 | Iida et al. | 348/333.02 |
| 2003/0020824 A1 * | 1/2003 | Ito et al. | 348/345 |
| 2003/0081504 A1 | 5/2003 | McCaskill | 367/118 |
| 2005/0132408 A1 * | 6/2005 | Dahley et al. | 725/80 |

\* cited by examiner

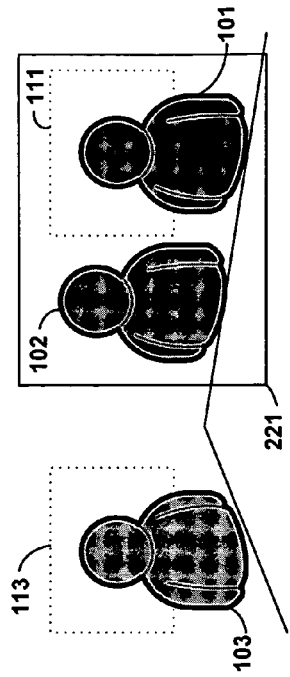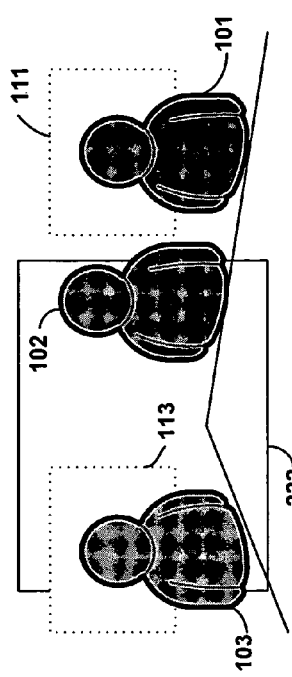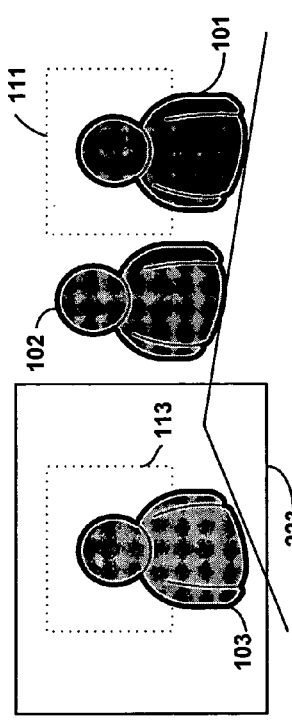
Fig. 2A  Fig. 2B  Fig. 2C
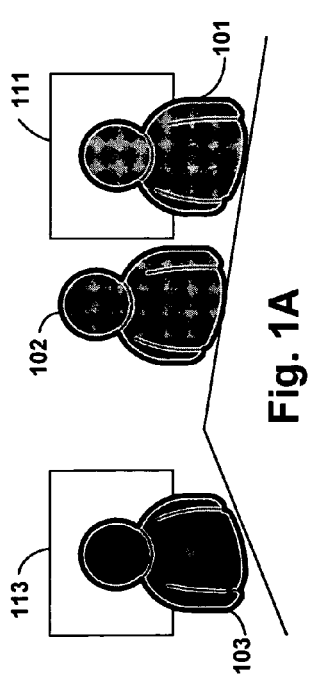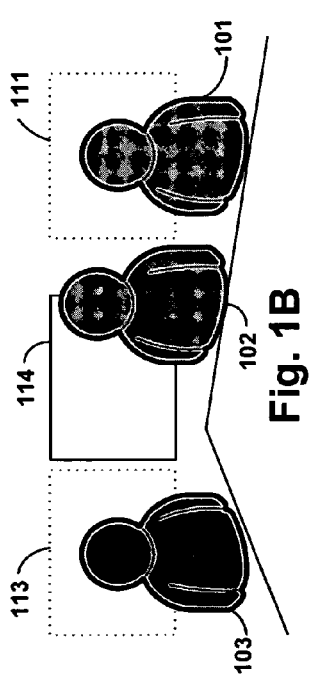
Fig. 1A (Prior Art)  Fig. 1B (Prior Art)  Fig. 1C (Prior Art)

NATURAL PAN TILT ZOOM CAMERA MOTION TO PRESET CAMERA POSITIONS

BACKGROUND OF THE INVENTION

1. Field of the Invention

The present invention relates generally to videoconferencing and more particularly to providing a method of improving the visual effect of moving a videoconferencing camera from one position (e.g., trained on a first videoconference participant) to a second position (e.g., a second video conference participant).

2. Description of Related Art

Videoconferencing systems have become relatively widespread in commercial and other applications. One reason for the proliferation of videoconferencing is that it provides a level of interactivity comparable to face-to-face meeting without the attendant expense of travel for conference participants that are not in the same physical location. The effectiveness of videoconferencing depends in part on providing an experience to the user that is comparable to face-to-face meeting. One way is which this is performed is through controlling the view of the videoconferencing camera to present an image to the remote users that corresponds to where they would focus there attention if they were in a face to face meeting. For example, when one person is speaking, the camera may zoom in to a head and shoulders view of the speaker. Alternatively, when someone at the local end of a conference is speaking, the camera at the remote end may zoom out so that the speaker can see all of the remote conference participants. All of this is accomplished through pan, tilt, and zoom control of the videoconferencing camera.

This camera motion may be controlled manually. In such an application an operator, who may be one of the conference participants, uses some form of interface to manually adjust the pan, tilt, and zoom of either a local or remote camera. This typically takes the form of an arrow keypad or joystick type control. Often these controls (i.e., the camera controller) interface with the videoconferencing system, and may take the form of hardware, software or some combination thereof. However, in many cases camera motion is controlled automatically or semi-automatically. For purposes of the following description, automatic camera control will be used to refer to both types. In semi-automatic camera control, a variety of views are defined in memory as "preset" locations.

If it is known that two people at one end of a videoconference will be speaking during the course of the conference, a close up view of each of them is defined as well as a broader, zoomed out view of the entire endpoint of the conference. A videoconference operator can then select between these camera positions by the simple push of a button, which will interface with the camera controller to point the camera to one of the preset viewpoints. These preset views may either be set up during the course of the videoconference or they may be set manually during the course of the videoconference and saved as preset positions so that the operator can return to that position at future times by pushbutton rather than manual adjustment. Again, the camera controller will be some combination of hardware and software that either interfaces with the videoconferencing system or is part of the videoconferencing system.

Alternatively, for automatic camera control, the videoconferencing system typically includes a camera controller that is capable of processing the audio signal picked up by microphones and the video signal generated by the camera for determining the location of the speaker. Thus the videoconferencing system can determine the precise location of the speaker's face and can automatically "zoom in" on this location. Exemplary systems for accomplishing this are disclosed in U.S. Pat. No. 5,778,082 entitled "Method And Apparatus For Localization Of An Acoustic Source; U.S. Pat. No. 6,593,956 entitled "Locating An Audio Source" and co-pending U.S. patent application Ser. No. 10/004,070 entitled "Automatic Camera Tracking using Beamforming," which are hereby incorporated by reference in their entirety.

In prior art videoconference systems incorporating automatic or semi-automatic camera control, the camera typically moves from one preset position to another as follows: the camera is panned all the way to the next pan (and/or tilt) position and then zoomed to the next zoom position. Alternatively, the camera may be zoomed to the next zoom level and then panned (and/or tilted) to the next pan (and/or tilt) position. In either case, this type of camera motion is aesthetically desirable only when the positions of the two presets are relatively close together. In many cases, two preset positions are not sufficiently close, making such camera motion is undesirable. For example, if the current camera position is zoomed in all the way, for example, to show a close-up of a conference participant, when moving to the next preset, the camera pans through the positions between the first and second preset at full zoom. Often, this results in too large images of conference participants and/or other objects, which is a less than pleasing aesthetic effect.

Professional video productions avoid this undesirable effect in such an instance by zooming out from the first position, panning from the zoomed out position to the new position, and then zooming in to the second position. While this technique does alleviate the undesirable aesthetic effect of the camera motion described in the preceding paragraph, it requires the intervention of a professional camera operator, which is frequently unavailable for most videoconferences and which adds significant expense to videoconferencing even if available.

Therefore what is needed in the art is a technique that accomplishes more desirable transitions between preset camera positions in a videoconference without requiring the intervention of a professional camera operator. Disclosed herein is such a system.

SUMMARY OF THE INVENTION

The system disclosed herein seeks to solve the problem of unnatural, dizzy camera motion when moving a camera between two preset positions, e.g., head and shoulder shots of two videoconference participants. Particularly, the system described herein attempts to mimic the camera movement that a professional camera operator would use in a professional video production. A preferred method of moving the camera between two positions is to first zoom out, away from the first position, pan across to the next position, then zoom in. This gives viewers of the camera content an idea of the spatial relationship between the two camera positions and also avoids the aesthetically undesirable effect of panning through irrelevant visual background at high zoom ratios. Disclosed herein is a technique of producing this desired behavior in the context of an automatically or semi-automatically controlled video camera, such as those used in conjunction with videoconferencing equipment.

BRIEF DESCRIPTION OF THE DRAWINGS

FIGS. 1A-1C depict various views of one end of a videoconference according to the prior art.

FIGS. 2A-2C depict various views of one end of a videoconference when using the camera control method described herein.

DETAILED DESCRIPTION OF THE INVENTION

Clearer understanding of the prior art problem to which the system disclosed herein provides a solution may be better understood with reference to FIGS. 1A-1C. In each of these figures, one "endpoint" of a videoconference is depicted, comprising three conference participants 101, 102, and 103 seated around a conference table. To provide the most beneficial and aesthetically pleasing videoconference, multiple camera views may be defined, each corresponding to a particular camera pan angle, tilt angle, and zoom ratio. For example, an overall view might show the entire scene. Another typical camera view might be a head and shoulders close up of a conference participant, such as view 111 of participant 101 and view 113 of participant 103 depicted in FIG. 1A.

During the course of the videoconference, it will likely be necessary to move the camera from view 111 to view 113, for example, if participant 101 stopped speaking and participant 103 started speaking. As noted above, prior art videoconferencing systems would accomplish this transition by panning directly from position 111 to position 113. Although this would ultimately result in the correct view being displayed because the views 111 and 113 have approximately the same tilt angle and zoom ratio, thus only a pan angle change is required. However, this camera motion would produce a variety of undesirable camera views in the course of the transition. For example, as depicted in FIG. 1B, camera position 114 would show some portion of the head and shoulders of conference participant 102 and also whatever happened to be behind the conference participants, all at a relatively high level of magnification because of the zoom ratio.

As described above, in the context of professional video production this undesirable effect is overcome by zooming out from the first position, panning to the second position, and then zooming in. Using professional grade video cameras, these steps may overlap, for example, the panning operation overlaps with both the zooming out from the first position and the zooming in to the second position. This is not practical in the context of videoconferencing systems because professional camera operators are rarely available, and many videoconferencing cameras do not have the capability for coordinated multi-axis motion. However, the inventors have formulated a technique by which this desirable motion may be generally replicated. Instead of moving camera from one preset to the next directly, an intermediate position is defined, which acts as a transitioning point. In this way, camera zooms out first and then pans, tilts, and zooms as required to reach the next camera position.

However, such a transition technique is generally not required if the two camera positions are relatively close together. For example, as depicted in FIG. 1C, the close-up view 112 of participant 102 is sufficiently close to the close up view 111 of participant 101 that panning directly between the two does not produce any undesirable effects, and, in fact, the transition method summarized above would produce an awkward result. Thus the technique disclosed herein first determines if the two presets are sufficiently close together that direct camera movement to the next position (without the intermediate position) is appropriate before defining and moving to an intermediate position.

The transition between two preset camera positions corresponding to two predefined views 111 and 113 may be advantageously understood with reference to FIGS. 2A-2C, which illustrate the same conference endpoint depicted in FIGS. 1A-1C. For purposes of this example, camera begins at a first preset position corresponding to view 111 showing a head and shoulders close-up of conference participant 101. A videoconference operator, which may be one of the participants at either the near or far end, selects a second preset position 113 corresponding to a head and shoulders close-up of participant 103. The videoconferencing system is programmed to control the camera so as to execute this transition in the most desirable manner possible, either using the zoom and pan technique or the direct pan technique. To accomplish this, the first step is for the camera controller to determine the relative position between the two camera positions.

This is typically accomplished using position encoders located on each of the three axes, i.e., pan, zoom, and tilt, of the camera. Use of such encoders is well known to those skilled in the art and as such is not repeated here. To be a predefined position, the camera controller, which may be the videoconference unit or another piece of hardware or software, must have stored the position information for each of the three axes (determined from the three encoders) in some form of memory. This facilitates the computation of the difference between two positions. Specifically, the camera's current position, e.g., the position corresponding to view 111 can be defined in terms of three values: currPan, currTilt, currZoom. Similarly, the next camera position, e.g., the position corresponding to view 113 can also be defined in terms of three values: nextPan, nextTilt, nextZoom. The difference between these positions is then the absolute value of the difference in pan angle and tilt angle, as indicated by the following equations:

$$\Delta Pan = |currPan - nextPan|$$

$$\Delta Tilt = |currTilt - nextTilt|$$

The greater of these two position changes, i.e. the axis exhibiting the largest amount of motion, is used to define the magnitude of the position change, thus determining rather direct translation or motion through an intermediate position is indicated. Thus if the change in pan position is greater than or equal to the change in tilt position (i.e., $\Delta Pan \geq \Delta Tilt$), $\Delta Pan$ is used to define the magnitude of the shift. Alternatively, if the change in pan position is less than the change in tilt position (i.e., $\Delta Pan < \Delta Tilt$), $2 \cdot \Delta Tilt$ (i.e., twice the magnitude of the tilt change) is used to define the magnitude of the shift. It has been determined through experimentation by the inventors that if the magnitude of the shift is greater than a threshold of about 22.5° it is preferable to define an intermediate position and transition the camera view through this position. Alternatively if the magnitude of the shift is less than this threshold of about 22.5° direct translation to the new camera position is preferred. Although a threshold of about 22.5° is believed to produce the most aesthetically pleasing result, this value could vary without departing from the scope of the invention.

If an intermediate position is required, its position is determined as follows. The intermediate pan position corresponds to the current pan position and the intermediate tilt position corresponds to the current tilt position, i.e., the initial change is in zoom only. The intermediate zoom position is determined as a percentage of the lesser of the current zoom or the next zoom, i.e., the one that is zoomed out more. The percentage is determined according to the following formula:

$$\text{percentage} = \left(1 - \frac{\text{magnitude} - \text{threshold}}{180° - \text{threshold}}\right) \cdot 70\%$$

where: magnitude is the magnitude of the shift determined as described in the preceding paragraph and threshold is the threshold for making a direct transition between the presets or making the transition through an intermediate position. The constant 180° corresponds to the full pan or tilt range of the camera, and could vary for cameras with greater or lesser degrees of movement available. (Pan or tilt is selected based on whether it is the pan or tilt value that determines magnitude.) Finally, the 70% constant is selected based on experimentation by the inventors and is found to be the approximate value that produces optimal visual results. Again, this value could vary without departing from the scope of the invention.

Thus to execute a transition according to this method, an intermediate zoom position is computed based on the difference between the current position and the next position. As indicated in FIG. 2A, based on the initial camera position to generate view 111 of conference participant 101 and the next camera position to generate view 113 of conference participant 103, an intermediate zoom position is computed. This intermediate zoom position results in the zoomed out view 221 of conference participants 101 and 102. Once the intermediate zoom position is reached, the camera is panned (and/or tilted if necessary) to reach the pan and tilt position of view 113, still remaining at the intermediate zoom level. This results in the view 223 depicted in FIG. 2C. From view 223, the camera is zoomed in to produce the desired view 113 of conference participant 103.

It will also be noted that in panning the camera from intermediate view 221 (corresponding in position to initial view 111 but at the intermediate zoom level) to intermediate view 223 (corresponding in position to final view 113 but at the intermediate zoom level), the intermediate images do not have the undesired effect of showing less relevant video content at unreasonably high levels of magnification. For example, as depicted in FIG. 2B, one of the intermediate views 222 in the panning operation shows conference participants 102 and 103, providing spatial context as to the relative locations of all the conference participants.

The invention has been explained with reference to exemplary embodiments. It will be evident to those skilled in the art that various modifications may be made thereto without departing from the broader spirit and scope of the invention. For example, although the values of constants described herein are selected to provide what the inventors believe to be the most aesthetically pleasing results, the results of the system described herein are somewhat subjective and other values of constants could also be selected. Additionally it is noted that the drawings used in describing the invention are not to scale, and are intended to be schematic in nature rather than exact depictions of the ratios, proportions, and other mathematical relationships described herein. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method executed by a camera controller of controlling the motion of a camera between a first preset position and a second preset position, the method comprising:
   retrieving coordinates of the first preset position and the second preset position from a memory;
   computing a difference between the first preset position and the second preset position using the retrieved coordinates;
   comparing the difference to a predetermined threshold, and, if the difference is greater than the predetermined threshold:
   computing an intermediate position as a function of the difference; and
   automatically moving the camera from the first preset position to the intermediate position.

2. The method of claim 1 further comprising moving the camera from the intermediate position to the second preset position.

3. The method of claim 2 wherein the intermediate position is a first intermediate position and wherein the step of moving the camera from the first intermediate position to the second preset position includes moving the camera to a second intermediate position.

4. The method of claim 1 wherein moving the camera from the first preset position to the intermediate position consists of a zoom operation.

5. The method of claim 3 wherein:
   moving the camera from the first preset position to the first intermediate position consists of a zoom operation;
   moving the camera from the first intermediate position to the second intermediate position comprises at least one operation selected from the group consisting of a pan operation and a tilt operation; and
   moving the camera from the second intermediate position to the second preset position consists of a zoom operation.

6. The method of claim 1 wherein computing the difference between the first preset position and the second preset position comprises selecting the greater of:
   the absolute value of the difference between the pan position of the first preset position and pan position of the second preset position; and
   the absolute value of the difference between the tilt position of the first preset position and the tilt position of the second preset position.

7. The method of claim 2 wherein computing the difference between the first preset position and the second preset position comprises selecting the greater of:
   the absolute value of the difference between the pan position of the first preset position and pan position of the second preset position; and
   the absolute value of the difference between the tilt position of the first preset position and the tilt position of the second preset position.

8. The method of claim 1 wherein the threshold is approximately 22.5°.

9. The method of claim 6 wherein the threshold is approximately 22.5°.

10. The method of claim 7 wherein the threshold is approximately 22.5°.

11. The method of claim 1 wherein computing an intermediate position as a function of the difference comprises computing intermediate zoom as a percentage of the lesser of first preset zoom and second preset zoom.

12. The method of claim 11 wherein the percentage zoom is determined according to the following formula:

$$\text{percentage} = \left(1 - \frac{\text{magnitude} - \text{threshold}}{180° - \text{threshold}}\right) \cdot 70\%$$

where magnitude is the difference between the first preset position and the second preset position.

13. The method of claim 2 wherein computing an intermediate position as a function of the difference comprises computing intermediate zoom as a percentage of the lesser of first preset zoom and second preset zoom.

14. The method of claim 13 wherein the percentage zoom is determined according to the following formula:

$$\text{percentage} = \left(1 - \frac{\text{magnitude} - \text{threshold}}{180° - \text{threshold}}\right) \cdot 70\%$$

where magnitude is the difference between the first preset position and the second preset position.

15. A videoconferencing system having a camera controller, the camera controller comprising a programmable electronic device for performing the method of any of claims 1-14.

16. A method executed by a camera controller of controlling the motion of a camera between a first preset position and a second preset position, the method comprising:
   retrieving coordinates of the first preset position and the second preset position from a memory;
   computing a difference between the first preset position and the second preset position;
   comparing the difference to a predetermined threshold, and, if the difference is greater than the predetermined threshold:
   computing a first intermediate position as a function of the difference;
   automatically moving the camera from the first preset position to the intermediate position; and
   automatically moving the camera from the intermediate position to the second preset position.

17. The method of claim 16 wherein the intermediate position is a first intermediate position and wherein the step of moving the camera from the first intermediate position to the second preset position includes moving the camera to a second intermediate position.

18. The method of claim 17 wherein the first intermediate position has a pan position and a tilt position that correspond to the first preset position and wherein the second intermediate position has a pan position and a tilt position that correspond to the second preset position.

19. The method of claim 18 wherein the first intermediate position and the second intermediate position have a zoom position determined as a percentage of the lesser of first preset zoom and second preset zoom, and wherein the percentage is determined according to the following formula:

$$\text{percentage} = \left(1 - \frac{\text{magnitude} - \text{threshold}}{180° - \text{threshold}}\right) \cdot 70\%$$

where magnitude is the difference between the first preset position and the second preset position.

20. The method of claim 19 where threshold is about 22.5°.

21. A videoconferencing system having a camera controller, the camera controller comprising a programmable electronic device for performing the method of any of claims 16-19.

* * * * *

UNITED STATES PATENT AND TRADEMARK OFFICE
CERTIFICATE OF CORRECTION

PATENT NO. : 7,623,156 B2
APPLICATION NO. : 10/892813
DATED : November 24, 2009
INVENTOR(S) : Nimri et al.

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 977 days Delete the phrase "by 977 days" and insert -- by 1468 days --

Signed and Sealed this

Seventeenth Day of August, 2010

David J. Kappos
*Director of the United States Patent and Trademark Office*